(12) United States Patent
Liff et al.

(10) Patent No.: US 10,594,029 B2
(45) Date of Patent: Mar. 17, 2020

(54) ACTUATABLE AND ADAPTABLE METAMATERIALS INTEGRATED IN PACKAGE

(71) Applicant: Intel Corporation, Santa Clara, CA (US)

(72) Inventors: Shawna M. Liff, Scottsdale, AZ (US); Adel A. Elsherbini, Chandler, AZ (US); Sasha N. Oster, Chandler, AZ (US); Feras Eid, Chandler, AZ (US); Georgios C. Dogiamis, Chandler, AZ (US); Thomas L. Sounart, Scottsdale, AZ (US); Johanna M. Swan, Scottsdale, AZ (US)

(73) Assignee: Intel Corporation, Santa Clara, CA (US)

( * ) Notice: Subject to any disclaimer, the term of this patent is extended or adjusted under 35 U.S.C. 154(b) by 771 days.

(21) Appl. No.: 15/283,140

(22) Filed: Sep. 30, 2016

(65) Prior Publication Data

US 2018/0097284 A1 Apr. 5, 2018

(51) Int. Cl.
*H01Q 1/52* (2006.01)
*H01L 41/09* (2006.01)
(Continued)

(52) U.S. Cl.
CPC .......... *H01Q 1/526* (2013.01); *H01L 41/047* (2013.01); *H01L 41/094* (2013.01); *H01Q 1/273* (2013.01);
(Continued)

(58) Field of Classification Search
CPC ...... H01Q 1/526; H01Q 5/50; H01Q 15/0086; H01Q 1/273; H01L 41/094; H01L 41/047
See application file for complete search history.

(56) References Cited

U.S. PATENT DOCUMENTS

| 8,106,851 B2 * | 1/2012 | Hyde | H01Q 15/0086 343/909 |
| 2011/0101828 A1 * | 5/2011 | Noda | H01L 41/0478 310/348 |

(Continued)

OTHER PUBLICATIONS

International Search Report and Written Opinion for International Application No. PCT/US2017/049215, dated Dec. 13, 2017, 14 pages.

(Continued)

*Primary Examiner* — Hoang V Nguyen
(74) *Attorney, Agent, or Firm* — Schwabe, Williamson & Wyatt, P.C.

(57) ABSTRACT

Embodiments of the invention include a reconfigurable communication system, that includes a substrate and a metamaterial shield formed over the substrate. In an embodiment, the metamaterial shield surrounds one or more components on the substrate. Additionally, a plurality of first piezoelectric actuators may be formed on the substrate. The first piezoelectric actuators may be configured to deform the metamaterial shield and change a frequency band that is permitted to pass through the metamaterial shield. Embodiments may also include a reconfigurable antenna that includes a metamaterial. In an embodiment, a plurality of second piezoelectric actuators may be configured to deform the metamaterial of the antenna and change a central operating frequency of the antenna. Embodiments may also include an integrated circuit electrically coupled to the plurality of first piezoelectric actuators and second piezoelectric actuators.

22 Claims, 9 Drawing Sheets

(51) Int. Cl.
- *H01L 41/047* (2006.01)
- *H04L 29/06* (2006.01)
- *H01Q 1/27* (2006.01)
- *H04W 12/12* (2009.01)
- *H04L 29/08* (2006.01)
- *H01Q 15/00* (2006.01)
- *H04W 12/00* (2009.01)

(52) U.S. Cl.
CPC ..... *H01Q 15/0086* (2013.01); *H04L 63/0245* (2013.01); *H04L 63/1475* (2013.01); *H04L 67/12* (2013.01); *H04L 67/146* (2013.01); *H04W 12/12* (2013.01); *H04W 12/0052* (2019.01)

(56) References Cited

U.S. PATENT DOCUMENTS

| | | | |
|---|---|---|---|
| 2012/0154793 A1 | 6/2012 | Pryce et al. | |
| 2012/0170114 A1* | 7/2012 | Domash | G02B 1/002 359/359 |
| 2013/0043767 A1* | 2/2013 | Yamamoto | H01L 41/094 310/330 |
| 2013/0170018 A1* | 7/2013 | Domash | G02F 1/29 359/320 |
| 2014/0054067 A1 | 2/2014 | Heikenfeld et al. | |
| 2015/0298322 A1* | 10/2015 | Morris | B25J 7/00 294/86.4 |
| 2015/0362625 A1* | 12/2015 | Hyde | G02B 1/005 359/280 |
| 2016/0133283 A1 | 5/2016 | Liu et al. | |
| 2016/0148963 A1 | 5/2016 | Creazzo et al. | |

OTHER PUBLICATIONS

Behnam Zarghooni, "Reconfigurable Metamaterial-based Antenna Using a novel class of Miniaturized Agile Unit-cells." Ph.D. dissertation. University of Quebec, Aug. 2015.

International Preliminary Report on Patentability for International Application No. PCT/US2017/049215, dated Apr. 11, 2019, 11 pages.

* cited by examiner

ACTUATABLE AND ADAPTABLE METAMATERIALS INTEGRATED IN PACKAGE

FIELD OF THE INVENTION

Embodiments of the present invention relate generally to actuatable metamaterials. In particular, embodiments of the present invention relate to actuatable metamaterials that are deformed by piezoelectrically driven actuators to enable secure communication systems.

BACKGROUND OF THE INVENTION

As the Internet of Things (IoT) industry continues to grow networked devices are beginning to be used in many applications (e.g., across enterprises, medical applications, automobiles, smart cities, authentication for banking, and physiological health monitoring). Due to the private and critical nature of many of these applications, it is necessary that secure data transfer be implemented. For example balancing privacy, safety, and security is key in the health industries, particularly for implantable medical devices and body area networks. While there has been significant research exploring software enabled security measures and physiological values as an input to cryptographic keys, these systems may still be vulnerable to adverse parties. Despite software and cryptographic keys, an adverse party may threaten security and privacy by eavesdropping on wireless communications at the telemetry interface or by actively jamming, replaying, modifying, forging, or dropping wireless communications.

Figure 1:
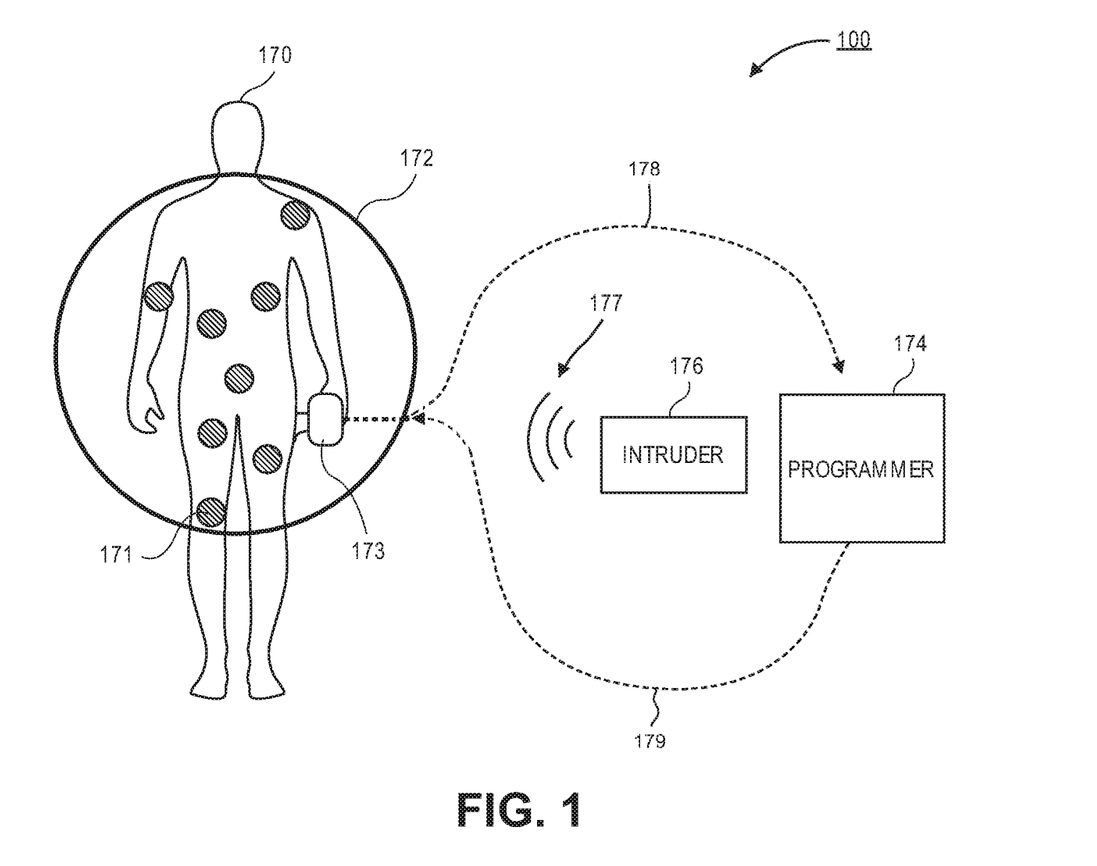
FIG. 1 is a schematic of a body area network that is susceptible to interference by an adverse party.

For example, FIG. 1 is a schematic of a body area network 172 that may be susceptible to intrusion by an adverse party 176. The body area network 172 may include a plurality of components 171 that are communicatively coupled to a telemetry interface 173. The components 171 may include physiological sensors (e.g., heart rate monitors, thermometers, perspiration sensors, etc.) or medical devices (e.g., pacemakers, insulin pumps, hearing aids, etc.). The telemetry interface 173 may transmit data 178 from the components 171 to a programmer 174 and receive commands 179 from the controller 174. The data 178 and the commands 179 may be transmitted over any wireless network, such as the internet or a local area network. As described above, these communications may be susceptible to eavesdropping and/or interference 177 by an adverse party 176. In the case of physiological sensors and implants, this intrusion may be particularly harmful since malicious signals may be sent to critical implants and result in unnecessary therapeutic treatments (e.g., a malicious signal may be sent to the telemetry interface 173 that results in a pacemaker 178 delivering a shock to the user's 170 heart when no cardiac event has taken place). While the particular instance of an adverse party 176 intruding into a body area network 172 is illustrated, it is to be appreciated that the communications between any networked devices may be intercepted in a substantially similar manner.

DETAILED DESCRIPTION OF THE INVENTION

Described herein are systems that include package integrated piezoelectrically driven actuators that reconfigure a metamaterial shield to provide secure communication pathways and methods of forming such systems. In the following description, various aspects of the illustrative implementations will be described using terms commonly employed by those skilled in the art to convey the substance of their work to others skilled in the art. However, it will be apparent to those skilled in the art that the present invention may be practiced with only some of the described aspects. For purposes of explanation, specific numbers, materials and configurations are set forth in order to provide a thorough understanding of the illustrative implementations. However, it will be apparent to one skilled in the art that the present invention may be practiced without the specific details. In other instances, well-known features are omitted or simplified in order not to obscure the illustrative implementations. Various operations will be described as multiple discrete operations, in turn, in a manner that is most helpful in understanding the present invention, however, the order of description should not be construed to imply that these operations are necessarily order dependent. In particular, these operations need not be performed in the order of presentation.

Embodiments of the invention include physically deformable metamaterials that provide secure communication pathways for IoT devices and/or system in packages (SiPs). According to an embodiment, the metamaterials may be selectively deformed by piezoelectric actuators that are formed on the package and/or formed on the metamaterial itself. Deforming the metamaterial may produce a drastic change in the performance of the metamaterial by changing the material properties, the spacing of conducting elements on the metamaterial, the magnetic permeability, refractive index or the like. In some embodiments, the metamaterial may function as a filter (e.g., an RF filter, an optical filter or reflector, etc.) that allows only a prescribed frequency band to pass through the metamaterial. In such embodiments, deformation of the metamaterial may change the material properties, thereby allowing for the frequency band to be changed. Additional embodiments may include antennas that include deformable metamaterials. In such embodiments, deformation of the metamaterial may alter the operating frequency to provide a tunable antenna.

Accordingly, embodiments of the invention prevent intrusion by being able to block interference that is sent at frequencies other than the current operating band of the metamaterial filter. Additionally, if an intruder were to determine the operating frequencies, then embodiments may provide the ability to reconfigure the filter by actuating the piezoelectric actuators to deform the metamaterial. Similarly, a reconfigurable antenna may change a center operating frequency to prevent eavesdropping by an intruder. As such, the metamaterials may function as invisibility cloaks, jammers or shields for IoT devices or SiPs, and provide selective (e.g., on-demand or one-way secure) networking solutions that may ensure secure communication channels and mitigate passive and active wireless attacks.

While tunable RF filters and frequency-reconfigurable antennas are currently used to achieve band selectivity in various applications, typically these tunable filters leverage active-voltage driven tuning and in some cases non-linear varactor-loaded (p-i-n-loaded) devices that operate as RF limiters. However, power can be an issue in instances where voltage must remain applied in order to maintain the desired, "tuned" state. In contrast, embodiments of the invention leverage deformable metamaterials integrated with piezoelectric elements and integrated circuitry to enable re-configurable RF filters, antennas, jamming devices, or shield elements that function with lower power consumption. For example, the power needed to enable metamaterial deformation may be minimized through stable switch elements that may be integrated or surface mounted directly on the package and controlled by an integrated circuit (IC).

Figure 2:
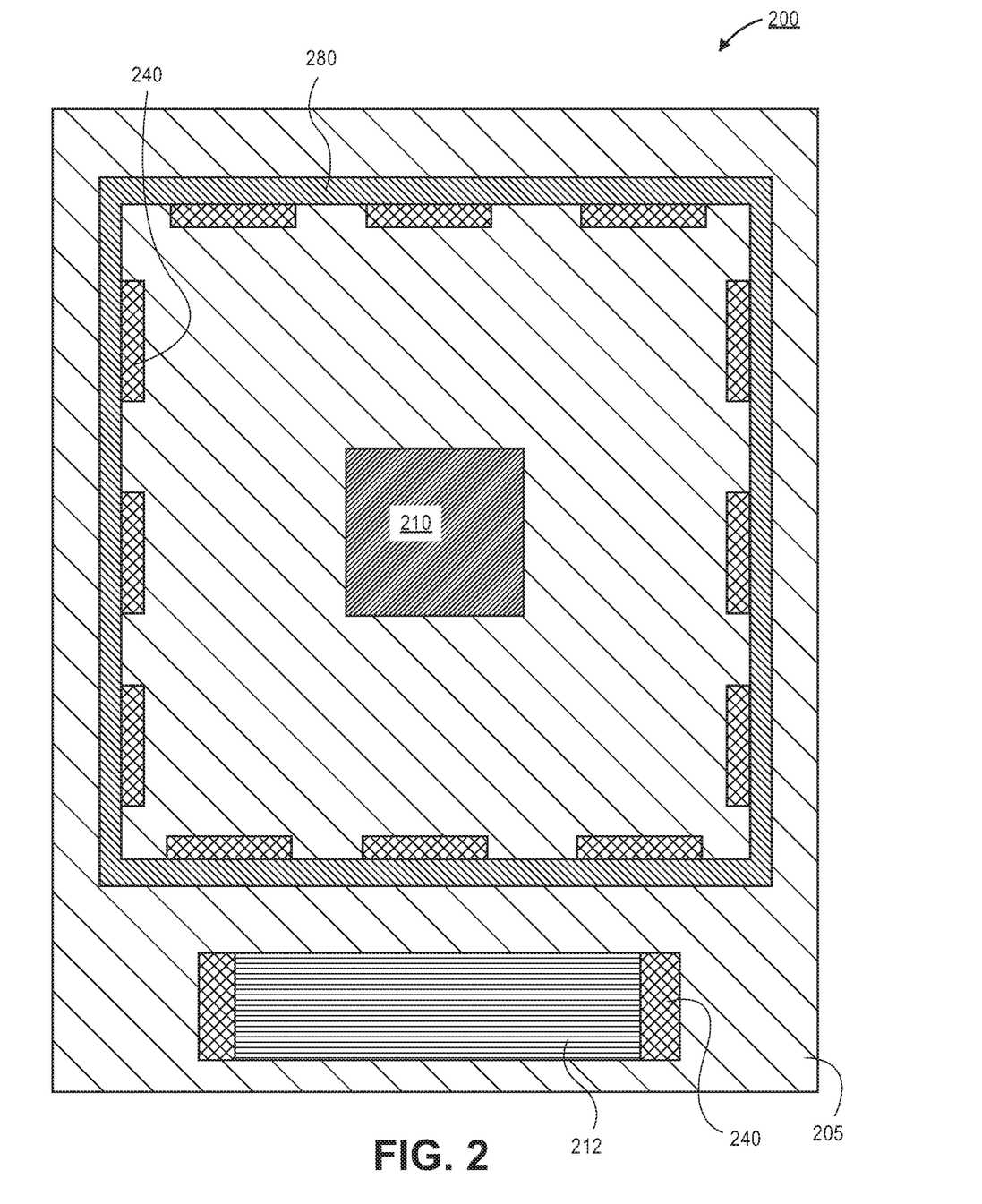
FIG. 2 is a schematic of a system that is secured by a deformable metamaterial that is deformed by piezoelectric actuators, according to an embodiment of the invention.

Referring now to FIG. 2, a schematic plan view of a system 200 is shown, according to an embodiment of the invention. In an embodiment, the system 200 may be formed on a substrate 205. The substrate 205 may be any suitable packaging substrate known in the art. For example, the substrate 205 may be an organic substrate. In some embodiments, the substrate 205 may be a rigid or flexible substrate. According to an embodiment, the system 200 may include a metamaterial shield 280. In the illustrated embodiment, the metamaterial shield 280 is shown as a ring. However, embodiments are not limited to a ring configuration. For example, the metamaterial shield 280 may also be a sheet or a can (e.g., a box) that is formed over substrate 205 or portions of the substrate 205. In an embodiment, the metamaterial shield 280 may be formed around one or more electrical components (which are not shown in order to not obscure the invention). These electrical components may include sensors, memories, integrated circuits, communication modules, or the like. While a single metamaterial shield 280 is shown in FIG. 2, it is to be appreciated that a plurality of metamaterial shields 280 may be used to provide protection to different regions of substrate 205. In an embodiment, the plurality of metamaterial shields 280 may be operated independently of each other.

According to an embodiment, the metamaterial shield 280 may be any suitable deformable metamaterial. In an embodiment, the metamaterial shield 280 may be designed to operate at various electromagnetic operating frequencies. For example, the cut-off frequency of the metamaterial shield 280 may be tunable through geometric tuning (i.e., deformation of the material). In an embodiment, the deformation may be elastic deformation that is linear or non-linear. Additionally, the deformation may be in the plane of the metamaterial or out of the plane of the metamaterial. Furthermore, the use of multiple piezoelectric actuators may allow for the metamaterials to be deformed locally. Accordingly, embodiments allow for portions of the metamaterial to have the properties modified, while the remainder of the metamaterial maintains the original properties.

In an embodiment, metamaterials used in the metamaterial may be collections of resonating structures, that may be aligned in a regular crystal lattice. The metamaterial may be characterized as possessing either effective material parameters for bulk, three-dimensional structures, or effective surface impedances for planar, two dimensional structures. Typically, resonators are designed to couple and interact with the free-space propagating electromagnetic waves. Accordingly, the metamaterials may be used as a filter, reflector, or antenna for different ranges of electromagnetic radiation. For example, the electromagnetic radiation that interacts with the metamaterial shields 280 described according to embodiments of the invention may include radio frequencies (RF) or optical frequencies. In an embodiment, the metamaterial shield may be designed to yield a desired refractive index and intrinsic impedance or permittivity and permeability profile or to match a desired frequency-dependent scattering response, which may be viewed as a dispersive constraint on the effective material parameters. Additionally, embodiments of the invention include deformable metamaterials that are able to have one or more of these parameters altered by deforming the metamaterial. For example, with respect to optical electromagnetic radiation, the refractive index may be changed (e.g., from a positive refractive index to a negative refractive index) in order to produce an invisibility cloak.

In addition to the use of true metamaterials for the metamaterial shield, embodiments of the invention may also include a metamaterial shield 280 that is formed from a metamaterial-inspired material. Whereas a true metamaterial-enabled material may include repeating patterns of unit cells across the material to allow for global effects (e.g., filtering, reflecting, use as an antenna, etc.), a metamaterial-inspired device may rely on the exact behavior of individual resonators or other structures formed on the material and will generally not utilize the metamaterial unit cells to obtain an effective global behavior. Although these metamaterial-enabled devices may not be considered to be true metamaterials, the fabrication approaches and design, and their use in systems may be substantially similar to those described herein with respect to metamaterials. Accordingly, as used herein, references to the term "metamaterial" may also include "metamaterial-inspired" as well.

While any type of deformable metamaterial may be used in accordance with embodiments of the invention, one example may include a metamaterial that is a composite material that includes conductive and insulative materials (e.g., an elastomeric matrix with conductive materials periodically positioned in the matrix). The conductive materials may resonate at a given frequency. However, deformation of the matrix may alter the periodicity of the conductive materials and/or induce buckling of structures patterned into the matrix. These changes may result in changes to the resonant frequency of the metamaterial shield 280. Additional embodiments may include conductive circuitry or antenna like features that are positioned over the surface of the metamaterial. The pattern may be chosen to perfectly reflect a given wavelength or a range of wavelengths. Deforming such a metamaterial may result in changes to the spacing of the structures resulting in the reflection of different wavelengths or ranges of wavelengths, allow the previously reflected wavelengths to pass through the metamaterial, and/or change the conductivity of the metamaterial.

In an embodiment, the metamaterial shield 280 may be deformed by one or more piezoelectric actuators 240. The piezoelectric actuators may be integrated into the substrate 205 and positioned so that the piezoelectric actuators are able to contact the metamaterial shield 280 (as will be described in greater detail below). Alternative embodiments of the invention may include integrating the piezoelectric actuators 240 on the metamaterial shield 280 itself. While not limited to any particular design or type of piezoelectric actuator 240, some examples of piezoelectric actuators 240 are included in greater detail below with respect to FIGS. 3A-5B. Embodiments of the invention include piezoelectric actuators 240 that deform the metamaterial shield 280 in and/or out of the plane of the metamaterial shield 280. Additionally, the piezoelectric actuators 240 may include one or more different types of piezoelectric actuators 240, depending on the needs of the system 200.

Embodiments of the invention include piezoelectric actuators 240 that are formed with a high performance piezoelectric material. For example, the high performance piezoelectric material may be lead zirconate titanate (PZT), potassium sodium niobate (KNN), zinc oxide (ZnO), or combinations thereof. High performance piezoelectric materials such as these typically require a high temperature anneal (e.g., greater than 500° C.) in order to attain the proper crystal structure to provide the piezoelectric effect. As such, currently available piezoelectric actuators require a substrate that is capable of withstanding high temperatures (e.g., silicon). Low melting temperature substrates described herein, such as organic substrates and some metamaterials, typically cannot withstand temperatures above 260° C. However, embodiments of the present invention allow for a piezoelectric material to be formed at much lower temperatures. For example, instead of a high temperature anneal, embodiments include depositing the piezoelectric material in an amorphous phase and then using a pulsed laser to crystallize the piezoelectric material. For example, the piezoelectric material may be deposited with a sputtering process, an ink jetting process, or the like. According to an embodiment, the pulsed laser annealing process may use an excimer laser with an energy density between approximately 10-100 mJ/cm$^2$ and a pulsewidth between approximately 10-50 nanoseconds. Utilizing such an annealing process allows for the high performance piezoelectric material to be formed without damaging the substrate 205 or the metamaterial on which the piezoelectric actuator 240 is formed.

In an embodiment, the piezoelectric actuators 240 may be controlled by an integrated circuit (IC) 210. The IC 210 may be electrically coupled to the piezoelectric actuators 240 by conductive traces (not shown) that are formed in and/or on the substrate 205. The IC 210 may control each of the piezoelectric actuators 240 in unison. In such embodiments, the metamaterial shield 280 may have its properties changed globally. In an alternative embodiment, the IC 210 may allow for the piezoelectric actuators 240 to be controlled independent of one another. As such, the metamaterial shield 280 may have its properties changed locally. In addition to being a control mechanism that may be used to coordinate motion of the piezoelectric actuators 240, the IC 210 may also calibrate the actuation of the piezoelectric actuators 240 to account for any variation resulting from fabrication differences between systems. Accordingly, embodiments include coupling deformable metamaterial elements with a microelectronics package to allow for robust implementation in secure IoT and/or SiP systems.

According to an embodiment, the system 200 may also include one or more reconfigurable antennas 212. In an embodiment, the reconfigurable antenna 212 may also be formed using deformable metamaterials, such as those described above. Accordingly, deformation of the metamaterial may allow for the center operating frequency of the antenna 212 to be changed, thereby allowing for communications to be implemented at many different bands with a minimal footprint. Similar to the metamaterial shield 280, the reconfigurable antenna 212 may be deformed by one or more piezoelectric actuators 240. In the illustrated embodiment, the reconfigurable antenna 212 is positioned outside of the metamaterial shield 280. However, embodiments of the invention are not limited to such configurations, and one or more reconfigurable antennas 212 may be positioned inside of the metamaterial shield 280 as well.

Figure 3A:
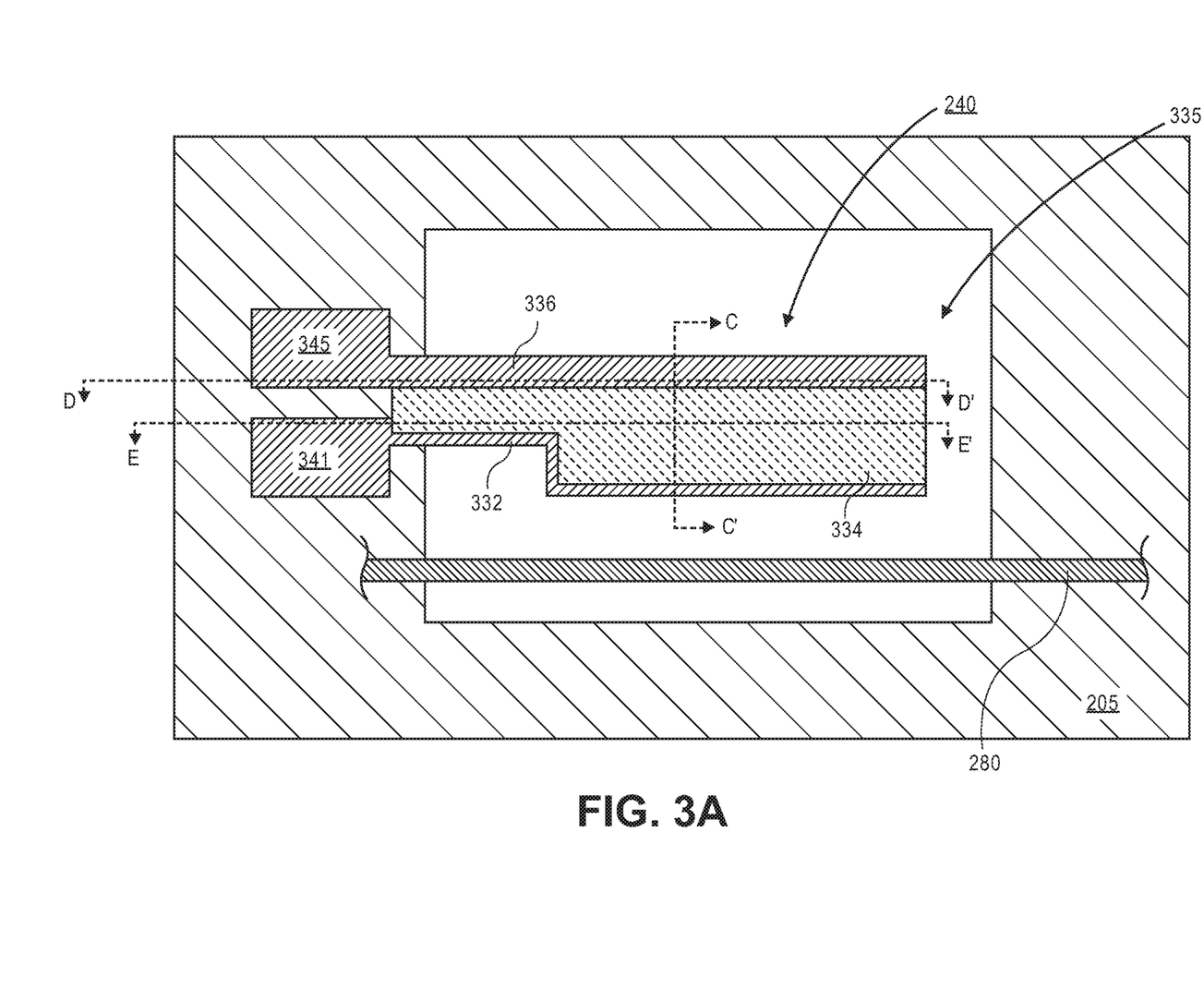
FIG. 3A is a plan view illustration of a piezoelectric actuator, according to an embodiment of the invention.
Figure 3B:
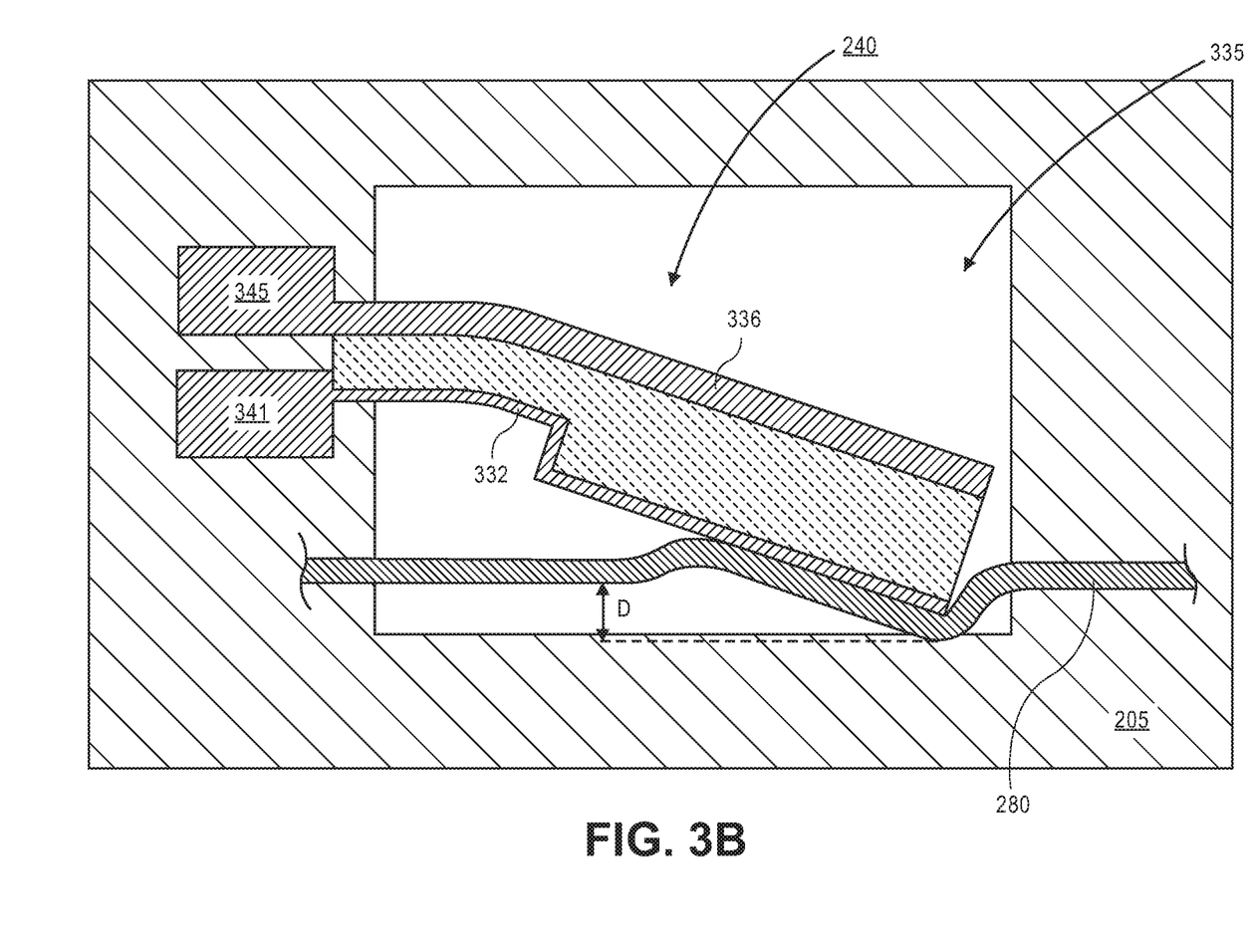
FIG. 3B is a plan view illustration of the piezoelectric actuator in FIG. 3A deforming the metamaterial, according to an embodiment of the invention.

Referring now to FIG. 3A, a plan view illustration of a piezoelectric actuator 240 that may be used to deform a metamaterial is shown, according to an embodiment of the invention. In FIG. 3A, the metamaterial is a metamaterial shield 280, though it is to be appreciated that the metamaterial may also be part of a reconfigurable antenna 212. In an embodiment, the piezoelectric actuator 240 may be actuatable in the plane of the substrate 205. Accordingly, the piezoelectric actuator 240 may be deflected so that it contacts and deforms the metamaterial shield 280. Additional embodiments may include localized deformation of the metamaterial shield 280, or global deformation of the metamaterial shield 280. For example, the actuator 240 may produce global deformation by inducing stress or compress across the entire metamaterial shield 280, even though the actuator 240 only contacts a localized portion of the metamaterial shield 280. As such, the changes in the material properties of the metamaterial shield 280 may be specific to a particular location, or result in a change to substantially the entire metamaterial shield 280.

In an embodiment of the invention, the piezoelectric actuator 240 may include a first electrode 332 and a second electrode 336 that is separated from the first electrode 332 by a piezoelectric material 334. In order to provide deflection in the plane of the substrate 205, the first electrode 332 and the second electrode 336 may be formed along opposing sidewall surfaces of the piezoelectric material 334. In such embodiments, applying a voltage across the piezoelectric material 334 may result in the piezoelectric material 334 deflecting towards the metamaterial shield 280, as illustrated in the plan view in FIG. 3B. Additionally, a non-uniform cross-section of the piezoelectric material 334 may be used to enhance the amount of deflection attainable by the piezoelectric actuator 240.

In order to provide free movement of the piezoelectric actuator 240, the piezoelectric actuator 240 may be oriented so that the first and second electrodes 332, 336 and the piezoelectric material 334 form a beam that extends over a cavity 335 formed in the substrate 205. Since the beam is not constrained from below by the substrate 205, the beam is free to move when the piezoelectric material 334 is strained when a voltage differential is applied between the first electrode 332 and the second electrode 336. Additionally, the piezoelectric actuator 240 is shown as a single beam that is deflected towards the metamaterial shield 280, though embodiments are not limited to this configuration. For example, it is to be appreciated that multiple actuatable beams may be used in conjunction with each other to form tri- or bi-stable mechanical actuators. Examples of such actuators are described in greater detail below with respect to FIGS. 6A-6C.

According to an embodiment, the first electrode 332 and the second electrode 336 may be anchored to the substrate 205 by a first anchor 341 and a second anchor 345, respectively. The first and second anchors 341, 345 may electrically couple the first and second electrodes 332, 336 to a voltage source (not shown), such as the IC 210. As such, a voltage differential across the first electrode 332 and the second electrode 336 may be generated. The voltage applied across the first electrode 332 and the second electrode 336 induces a strain in the piezoelectric layer 334 that causes displacement of the piezoelectric actuator 240. In an embodiment, the displacement of the piezoelectric actuator 240 is proportional to the voltage across the first electrode 332 and the second electrode 336. Accordingly, the piezoelectric actuator 240 may be operated in an analog mode to provide any desired amount of deformation D to the metamaterial shield 280. As such, the material properties of the metamaterial shield 280 may be reconfigured to allow for more than two operating conditions. In an embodiment, the piezoelectric actuator may also be operated in a digital manner (i.e., fully deflected or relaxed).

According to an embodiment, the first electrode 332 and the second electrode 336 are formed with a conductive material. In some embodiments, the first electrode 332 and the second electrode 336 may be formed with the same conductive material used to form the conductive traces, vias, and pads formed in the substrate 205. Such an embodiment allows for the manufacture of the microelectronic package to be simplified since additional materials are not needed, though embodiments are not limited to such configurations. For example, the electrodes 332, 336 may be different materials than the traces. The conductive material used for the first electrode 332 and the second electrode 336 may be any conductive material (e.g., copper, aluminum, alloys, etc.).

Embodiments of the invention include a high performance piezoelectric material for the piezoelectric layer 334. For example, the high performance piezoelectric layer 334 may be PZT, KNN, ZnO, or combinations thereof. Utilizing a low temperature annealing process, such as the one described above, allows for the high performance piezoelectric layer 334 to be formed without damaging the substrate 205 on which the piezoelectric actuator 240 is formed.

Figure 3C:
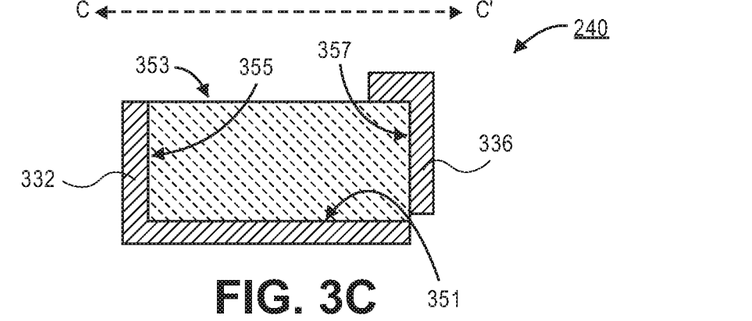
FIG. 3C is a cross-sectional illustration of the piezoelectric actuator along line C-C' in FIG. 3A, according to an embodiment of the invention.

Referring now to FIG. 3C, a cross-sectional illustration of a portion of the piezoelectric actuator 240 along line C-C' in FIG. 3A is shown, according to an embodiment of the invention. The cross-sectional view provides an example of how the piezoelectric layer 334 is supported between the first electrode 332 and the second electrode 336. In order to allow for actuation in the plane of the substrate 205, portions of the first electrode 332 are formed along a first sidewall 355 of the piezoelectric material 334 and portions of the second electrode 336 are formed along a second sidewall 357 that is opposite the first sidewall 355. In some embodiments, a portion of the first electrode 332 may be formed below a bottom surface 351 of the piezoelectric material 334. The portion of the first electrode 332 below the piezoelectric material 334 provides a support structure that may be used as a surface on which the piezoelectric material 334 is deposited during the formation of the piezoelectric actuator 240. In some embodiments, an insulative material (not shown) may be deposited over the portion of the first electrode 332 in order to provide an electrical field primarily oriented in the horizontal plane. Similarly, an insulative layer (not shown) may be formed over a top surface 353 of the piezoelectric material 334 in order to prevent portions of the second electrode 336 from contacting the piezoelectric material 334.

Figure 3D:
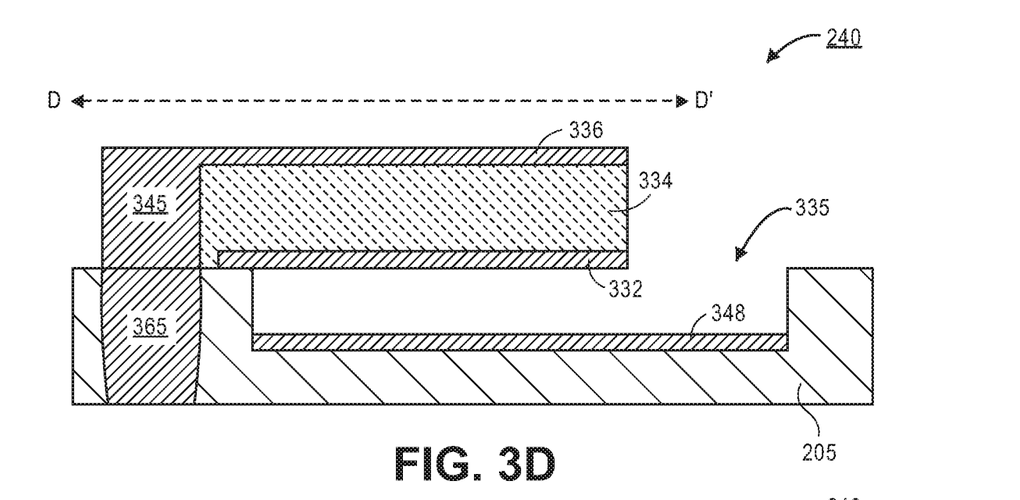
FIG. 3D is a cross-sectional illustration of the piezoelectric actuator along line D-D' in FIG. 3A, according to an embodiment of the invention.
Figure 3E:
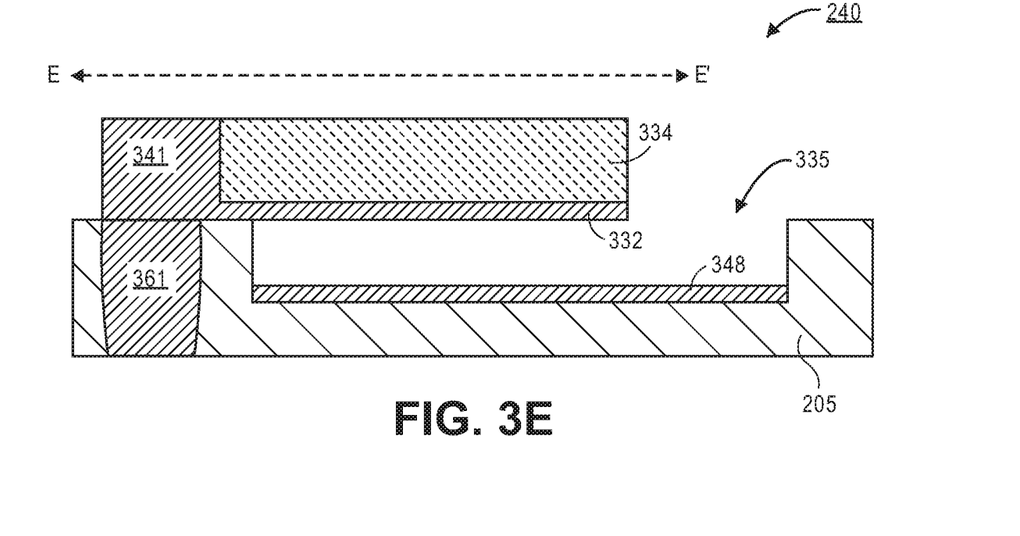
FIG. 3E is a cross-sectional illustration of the piezoelectric actuator along line E-E' in FIG. 3A, according to an embodiment of the invention.

Referring now to FIGS. 3D and 3E, cross-sectional illustrations of portions of the piezoelectric actuator 240 are shown along lines D-D' and E-E' in FIG. 3A, respectively, according to an embodiment of the invention. In FIG. 3D the cross-section illustrates a portion of the second electrode 336 formed over a top surface of the piezoelectric material 334 and electrically coupled to the second anchor 345. The second anchor 345 may also be coupled to pads, traces, and/or vias 365 formed in or on the substrate 305. In the illustrated embodiment, the second anchor 345 and the via 365 are illustrated as distinct regions, however embodiments are not limited to such configurations. For example, there may not be a discernable difference between the second anchor 345 and the vias 365. Additionally, the first electrode 332 is shown supporting the piezoelectric material 334 from below. According to an embodiment, the first electrode 332 may be electrically isolated from the second electrode 336 and the second anchor 345 by a portion of the piezoelectric material 334 that is formed over a surface of the substrate 205. Alternative embodiments may also include an insulative material (not shown) being formed between the first electrode 332 and the second electrode 336 and/or the second anchor 345.

Referring now to FIG. 3E, the cross-sectional illustration shows the connection between the first electrode 332 and the first anchor 341. According to an embodiment, the first electrode 332 extends substantially along the entire length of the piezoelectric material 334 in order to provide a surface on which the piezoelectric material 334 may be deposited.

Additionally, as illustrated in FIGS. 3D and 3E, an etchstop layer 348 may be formed at the bottom surface of the cavity 335, according to some embodiments of the invention. An etchstop layer 348 may be used to enable a controlled etching process that provides a precise and uniform depth for the cavity 335. In an embodiment, the etchstop layer 348 may be any suitable material that is resistant to an etching process used to form the cavity 335. In some embodiments, the etchstop layer 348 may be the same material as the electrodes or other conductive features formed in the substrate 205.

Figure 4A:
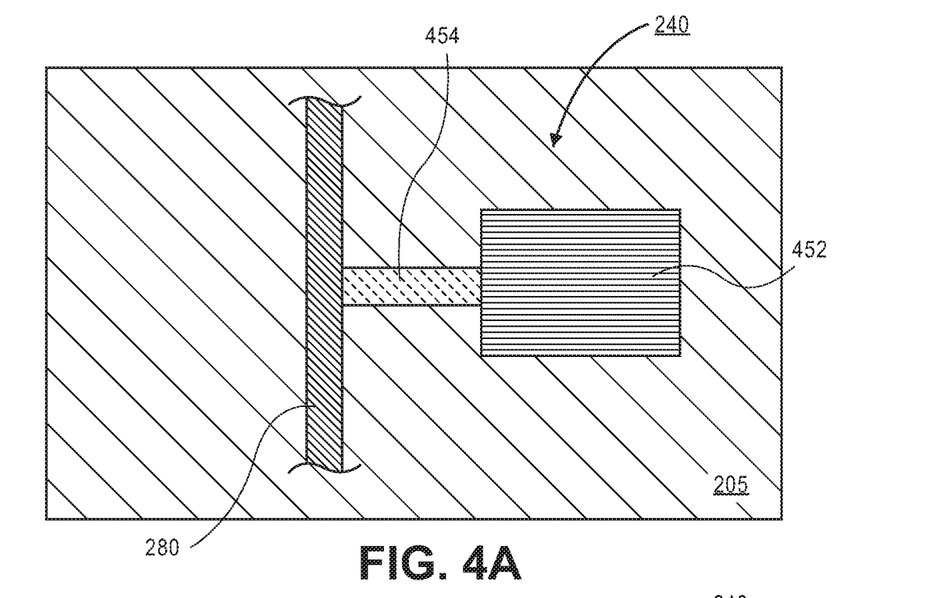
FIG. 4A is a plan view illustration of a piezoelectric actuator, according to an additional embodiment of the invention.
Figure 4B:
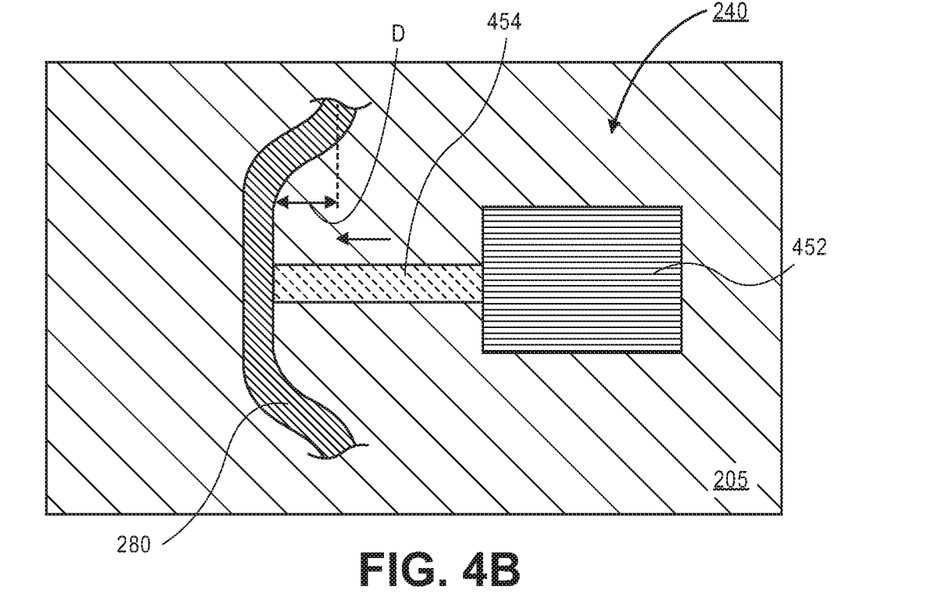
FIG. 4B is a plan view illustration of the piezoelectric actuator in FIG. 4A deforming the metamaterial, according to an embodiment of the invention.

Referring now to FIGS. 4A-4B, cross-sectional illustrations of a package integrated piezoelectric actuator 240 that deforms the metamaterial shield 280 are shown, according to an embodiment of the invention. In FIGS. 4A and 4B a metamaterial shield 280 is shown being deformed. However, embodiments of the invention may also include a substantially similar piezoelectric actuator deforming the metamaterial of a reconfigurable antenna 212. According to an embodiment, the piezoelectric actuator 240 may include a piezoelectric drive arm 454 that extends out from a sidewall surface of an anchor 452 mounted to the substrate 405. In an embodiment, the anchor 452 may be the same material as the substrate 405. Additional embodiments may include an anchor 452 that is a different material than the substrate 405 (e.g., the anchor 452 may be a deposited layer over the substrate 405, or may be surface mounted to the substrate 405) In an embodiment, the piezoelectric drive arm 454 may be a high performance piezoelectric material that is formed with a deposition and laser annealing process, such as the one described above. For example, the piezoelectric drive arm 454 may be deposited on a sacrificial material that is subsequently removed after the piezoelectric material has been annealed. In an embodiment, an end of the piezoelectric drive arm 454 may contact a surface of the metamaterial shield 280 when in the relaxed (i.e., unextended) position. Alternative embodiments may include a piezoelectric drive arm 454 that is spaced away from the metamaterial shield 280 when in the relaxed position.

According to an embodiment, the piezoelectric drive arm 454 may be actuated by electrodes (not shown) that provide a voltage differential across the piezoelectric material. In response to the voltage differential, the piezoelectric drive arm 454 may extend outwards, as illustrated by the arrow in FIG. 4B. In an embodiment, the piezoelectric drive arm 454 may be extended in an analog manner. For example, as the voltage differential applied to the piezoelectric drive arm 454 is increased the extension of the drive arm 454 may increase. Accordingly, the deformation D of the metamaterial shield may be controlled so that it is any value between zero deformation and the maximum extension of the drive arm 454. As such, the material properties of the metamaterial shield 280 may be reconfigured to allow for more than two operating conditions. In an embodiment, the drive arm 454 may also be operated in a digital manner (i.e., fully extended or relaxed).

Figure 5A:
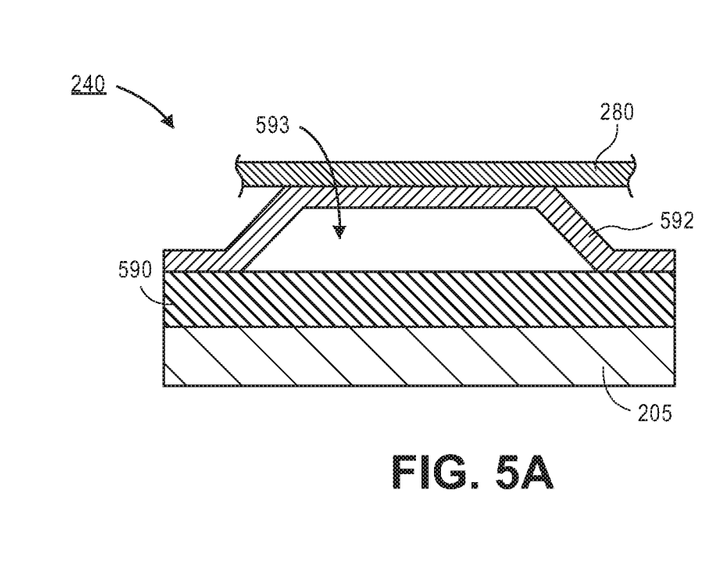
FIG. 5A is a cross-sectional illustration of a piezoelectric actuator, according to an additional embodiment of the invention.
Figure 5B:
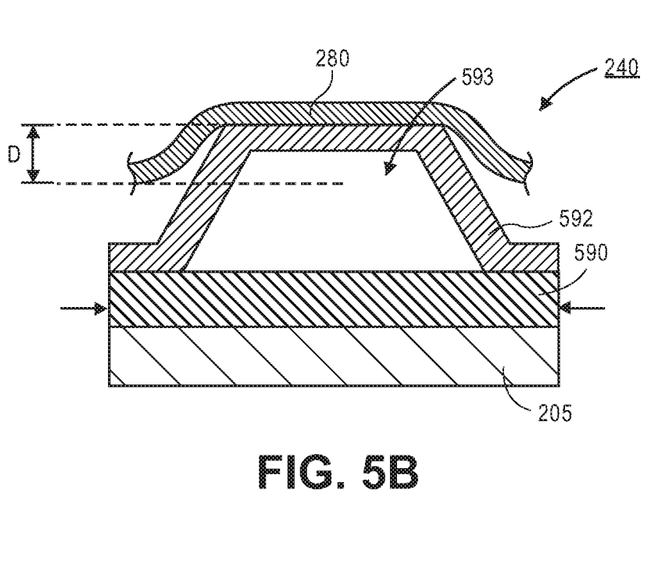
FIG. 5B is a cross-sectional illustration of the piezoelectric actuator in FIG. 5A deforming the metamaterial, according to an embodiment of the invention.

Additional embodiments of the invention may also utilize a piezoelectric actuator 240 that includes a diaphragm that is coupled to a piezoelectric layer in order to deform the metamaterial shield 280. Such an embodiment is illustrated with respect to FIGS. 5A and 5B. In FIGS. 5A and 5B a metamaterial shield 280 is shown being deformed. However, embodiments of the invention may also include a substantially similar piezoelectric actuator deforming the metamaterial of a reconfigurable antenna 212. As illustrated in FIG. 5A, the piezoelectric actuator 240 may include a piezoelectric layer 590 that is formed over a substrate layer 205. According to an embodiment, the piezoelectric layer 590 may be a high performance piezoelectric material that is formed with a deposition and laser annealing process, such as the one described above. A diaphragm 592 may be formed over the piezoelectric layer 590. For example, the diaphragm 592 may be formed by depositing a sacrificial material (not shown) over the piezoelectric layer 590 and then depositing the diaphragm 592 over the sacrificial material. The sacrificial material may then be removed to form a void 593 between the diaphragm 592 and the piezoelectric layer. In the illustrated embodiment, the metamaterial shield 280 is positioned over a top surface of the diaphragm 592.

Referring now to FIG. 5B, the piezoelectric layer 590 is contracted (as indicated by the arrows) by applying a voltage differential across the piezoelectric layer 590. Upon contraction of the piezoelectric layer 590, the diaphragm 592 deforms out of plane in the z-direction a distance D. The displacement of the diaphragm 592 causes the metamaterial shield 280 to deform, as illustrated. In an embodiment, the diaphragm 240 may be operated in an analog mode. As such, the material properties of the metamaterial shield 280 may be reconfigured to allow for more than two operating conditions. In an embodiment, the diaphragm 592 may also be operated in a digital manner (i.e., fully extended or relaxed).

The above examples describe switches where the actuation takes place upon energizing the piezoelectric layers. In such embodiments, the power needs to be continuously held in order to maintain the deformation of the metamaterial. However, it is to be appreciated that some embodiments of the invention may further include a bi- or tri-stable arrangement such that, upon charge, the actuator is shifted and held and conversely, charged again to move back to the original position. Additionally, in some embodiments, the process may be driven in reverse to release the actuation of the actuator. Accordingly, the actuated states may be maintained even when the power is removed, thereby reducing the overall system power.

Figure 6A:
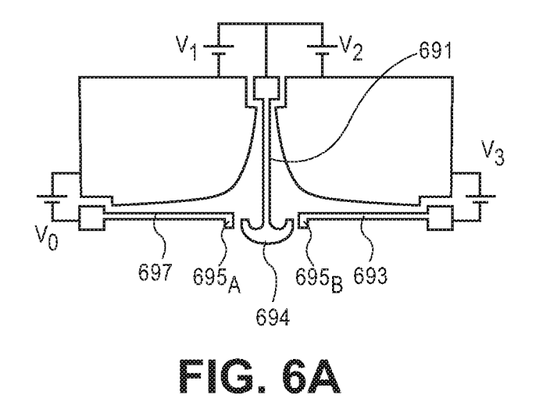
FIG. 6A is a schematic illustration of a mechanically tri-stable actuator that is in a first position, according to an embodiment of the invention.
Figure 6B:
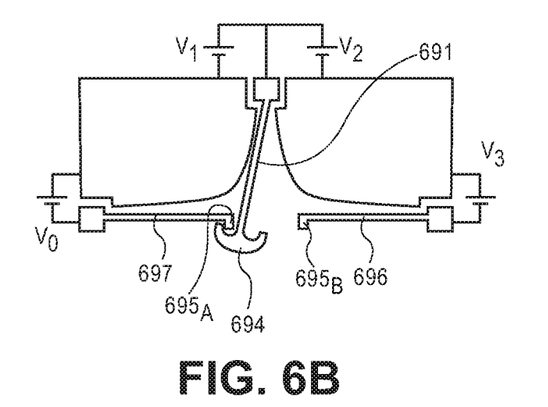
FIG. 6B is a schematic illustration of a mechanically tri-stable actuator that is in a second position, according to an embodiment of the invention.
Figure 6C:
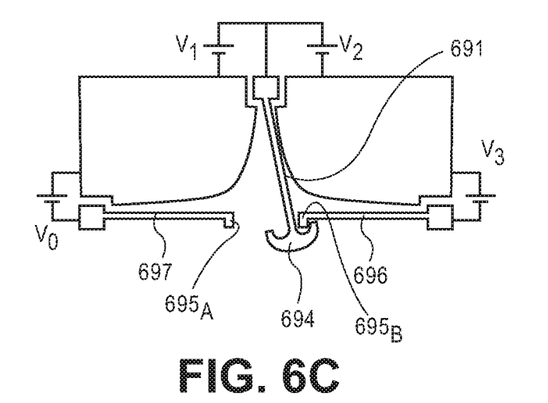
FIG. 6C is a schematic illustration of a mechanically tri-stable actuator that is in a third position, according to an embodiment of the invention.

A schematic illustration of an example of one suitable tri-stable mechanical state actuator that may be used according to embodiments of the invention is described with respect to FIGS. 6A-6C. While one example is shown, it is to be appreciated that embodiments of the invention may use any bi- or tri-stable mechanical state actuators.

As illustrated, the piezoelectric actuator 240 may be open (FIG. 6A), in a second position (FIG. 6B), or in a third position (FIG. 6C). According to an embodiment, a first beam 691 is mechanically held in the second and third positions by a mechanical anchor 694. For example in FIG. 6B, the anchor 694 of the first beam 691 is locked on to an end piece $695_A$ of beam 697. Similarly, in FIG. 5C, the anchor 694 of the first beam 691 is locked on to an end piece $595_B$ of beam 696.

In order to cause the anchor 694 to lock into either position (or be removed from the locked position) the first beam 691 and the beam (697 or 696 depending on the position to which the first beam 691 is being actuated) are actuated (e.g., with piezoelectric actuation substantially similar to the actuators described according to embodiments of the invention) sequentially to bring the anchor 694 and the end piece 695 into contact. For example, beam 697 may be actuated so that the beam 697 is deflected upwards. Thereafter, the first beam 691 may be actuated so that the anchor 694 is deflected under the end piece $695_A$ of beam 697. Once in position, the voltage applied to beam 697 may be removed, to allow beam 697 to return to a neutral position. However, the anchor 694 catches and secures the end piece $695_A$, preventing the full return back to the neutral position. After the end piece $695_A$ and the anchor 694 are secured to each other, the voltage to the first beam 691 may be released since the first beam 691 is prevented from returning back to the neutral position.

In order to release first beam 691 and allow it to return to the neutral position, the beam 697 may be deflected upwards by applying a voltage, thereby disengaging the end piece $695_A$ from the anchor 694. Since the voltage has been removed from the first beam 691, the first beam 691 may return to the neutral position and the voltage to beam 697 may also be released allowing beam 697 to return to the neutral position as well. A similar sequence may be used to cause the first beam 691 to be secured to or released from beam 696.

The different piezoelectric actuators described above according to various embodiments of the invention may be integrated as a single actuator in a system or a plurality of actuators may be used to form an array piezoelectric actuators in a system. A plurality of piezoelectric actuators may be integrated with different orientations to provide deformation of the metamaterials in multiple directions. Additional embodiments may include using a plurality of different piezoelectric actuators to allow for multiple forms of deformation of the metamaterials.

Figure 7:
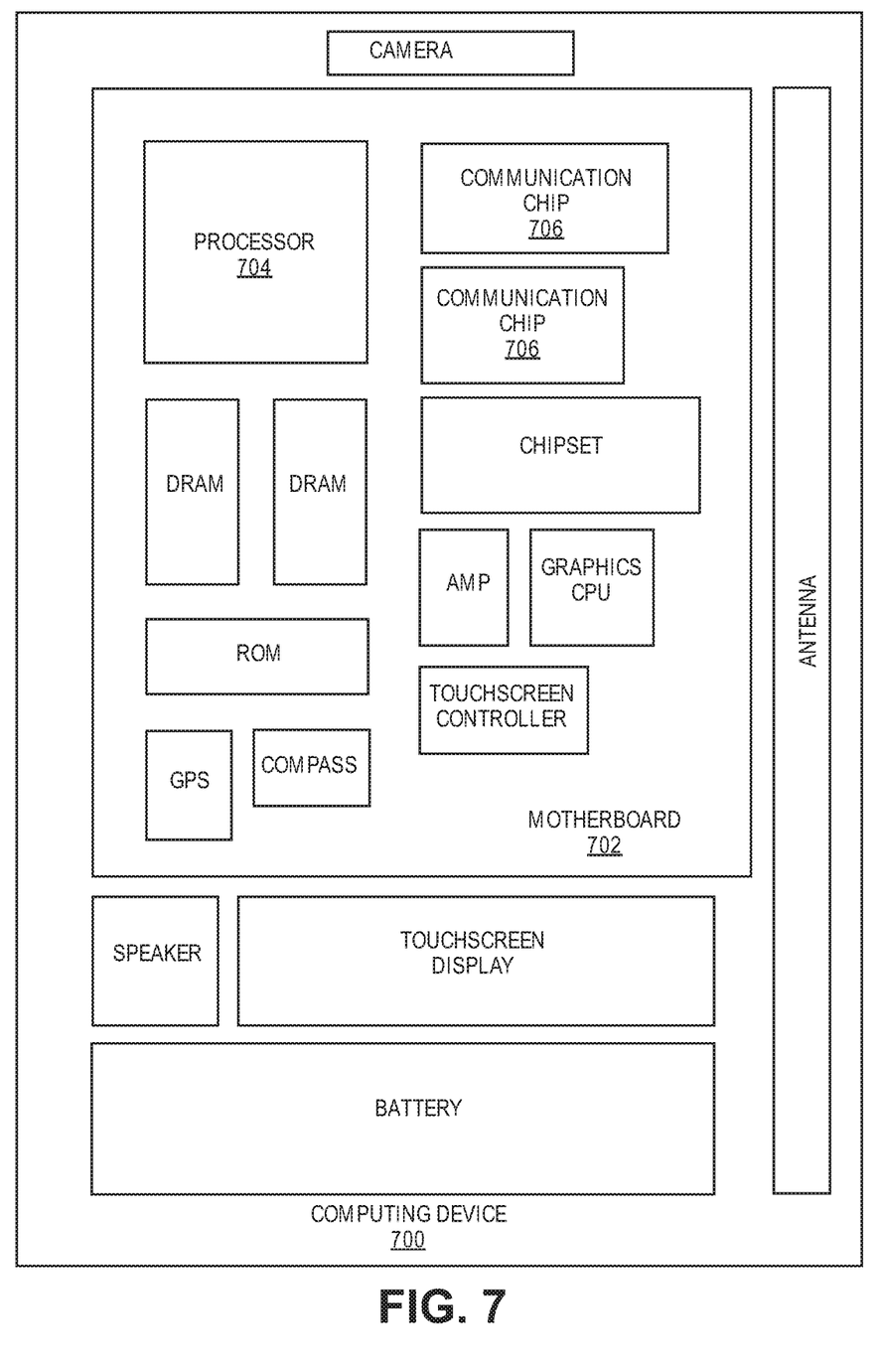
FIG. 7 is a schematic of a computing device built in accordance with an embodiment of the invention.

FIG. 7 illustrates a computing device 700 in accordance with one implementation of the invention. The computing device 700 houses a board 702. The board 702 may include a number of components, including but not limited to a processor 704 and at least one communication chip 706. The processor 704 is physically and electrically coupled to the board 702. In some implementations the at least one communication chip 706 is also physically and electrically coupled to the board 702. In further implementations, the communication chip 706 is part of the processor 704.

Depending on its applications, computing device 700 may include other components that may or may not be physically and electrically coupled to the board 702. These other components include, but are not limited to, volatile memory (e.g., DRAM), non-volatile memory (e.g., ROM), flash memory, a graphics processor, a digital signal processor, a crypto processor, a chipset, an antenna, a display, a touchscreen display, a touchscreen controller, a battery, an audio codec, a video codec, a power amplifier, a global positioning system (GPS) device, a compass, an accelerometer, a gyroscope, a speaker, a camera, and a mass storage device (such as hard disk drive, compact disk (CD), digital versatile disk (DVD), and so forth).

The communication chip 706 enables wireless communications for the transfer of data to and from the computing device 700. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication chip 706 may implement any of a number of wireless standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, derivatives thereof, as well as any other wireless protocols that are designated as 3G, 4G, 5G, and beyond. The computing device 700 may include a plurality of communication chips 706. For instance, a first communication chip 706 may be dedicated to shorter range wireless communications such as Wi-Fi and Bluetooth and a second communication chip 706 may be dedicated to longer range wireless communications such as GPS, EDGE, GPRS, CDMA, WiMAX, LTE, Ev-DO, and others.

The processor 704 of the computing device 700 includes an integrated circuit die packaged within the processor 704. In some implementations of the invention, the integrated circuit die of the processor may be packaged on an organic substrate and provide signals for actuating one or more piezoelectric actuators used for deforming a metamaterial shield, in accordance with implementations of the invention. The term "processor" may refer to any device or portion of a device that processes electronic data from registers and/or memory to transform that electronic data into other electronic data that may be stored in registers and/or memory.

The communication chip 706 also includes an integrated circuit die packaged within the communication chip 706. In accordance with another implementation of the invention, the integrated circuit die of the communication chip may be packaged on an organic substrate and provide signals for actuating one or more piezoelectric actuators used for deforming a metamaterial shield, in accordance with implementations of the invention.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize.

These modifications may be made to the invention in light of the above detailed description. The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

Example 1

A reconfigurable communication system, comprising: a substrate; a metamaterial shield formed over the substrate wherein the metamaterial shield surrounds one or more components; a plurality of piezoelectric actuators configured to deform the metamaterial shield; and an integrated circuit electrically coupled to the plurality of piezoelectric actuators.

Example 2

The reconfigurable communication system of Example 1, wherein at least one of the plurality of actuators includes a beam that contacts and deforms the metamaterial shield when deflected, wherein the beam comprises: a first electrode; a piezoelectric layer formed on the first electrode; and a second electrode formed on the piezoelectric layer.

Example 3

The reconfigurable communication system of Example 2, wherein the first electrode is formed below the piezoelectric layer and along a first sidewall of the piezoelectric layer, and wherein the second electrode is formed along a second sidewall of the piezoelectric layer that is opposite to the first sidewall.

Example 4

The reconfigurable communication system of Example 2 or Example 3, wherein the second electrode is also formed over a portion of a top surface of the piezoelectric layer.

Example 5

The microelectronic package of Example 2, Example 3, or Example 4, wherein the first electrode and the second electrode extend over a cavity formed in the package substrate and are electrically coupled to anchors on the package substrate.

Example 6

The reconfigurable communication system of Example 1, Example 2, Example 3, Example 4, or Example 5, wherein one or more of the piezoelectric actuators include a piezoelectric drive arm extending out from an anchor.

Example 7

The reconfigurable communication system of Example 6, wherein the piezoelectric drive arm contacts and deforms the metamaterial shield when extended.

Example 8

The reconfigurable communication system of Example 1, Example 2, Example 3, Example 4, Example 5, Example 6, or Example 7, wherein the piezoelectric actuator comprises: a piezoelectric layer formed over the substrate; and a diaphragm formed over the piezoelectric layer.

Example 9

The reconfigurable communication system of Example 8, wherein the diaphragm contacts and deforms the metamaterial shield upon contraction of the piezoelectric layer.

Example 10

The reconfigurable communication system of Example 1, Example 2, Example 3, Example 4, Example 5, Example 6, Example 7, Example 8, or Example 9, wherein the plurality of piezoelectric actuators include a high performance piezoelectric material that is deposited in an amorphous state and annealed with a laser annealing process.

Example 11

The reconfigurable communication system of Example 11, wherein the high performance piezoelectric material is lead zirconate titanate (PZT), potassium sodium niobate (KNN), or zinc oxide (ZnO).

Example 12

The reconfigurable communication system of Example 1, Example 2, Example 3, Example 4, Example 5, Example 6, Example 7, Example 8, Example 9, Example 10, or Example 11, further comprising: an antenna that includes a deformable metamaterial, wherein deforming the metamaterial changes the operating frequency of the antenna.

Example 13

The reconfigurable communication system of Example 12, further comprising one or more piezoelectric actuators configured to deform the metamaterial of the antenna.

Example 14

The reconfigurable communication system of Example 12 or Example 13, wherein the antenna is within the metamaterial shield.

Example 15

The reconfigurable communication system of Example 1, Example 2, Example 3, Example 4, Example 5, Example 6, Example 7, Example 8, Example 9, Example 10, Example 11, Example 12, Example 13, or Example 15, further comprising a plurality of metamaterial components.

Example 16

A reconfigurable component, comprising: a metamaterial substrate; a plurality of piezoelectric actuators formed on the metamaterial substrate; and an integrated circuit packaged adjacent to the metamaterial substrate and coupled to the plurality of piezoelectric actuators.

Example 17

The reconfigurable component of Example 16, wherein the component is a filter or reflector.

Example 18

The reconfigurable component of Example 16 or Example 17, wherein the actuation of the piezoelectric actuators deform the metamaterial substrate and changes a frequency band that is permitted to pass through the metamaterial substrate.

Example 19

The reconfigurable component of Example 16, Example 17, or Example 18, wherein the component is an antenna.

Example 20

The reconfigurable electromagnetic component of Example 19, wherein actuation of the piezoelectric actuators deform the metamaterial substrate and changes a central operating frequency of the antenna.

Example 21

The reconfigurable component of Example 16, Example 17, Example 18, Example 19, or Example 20, wherein the plurality of actuators are configured to deform the metamaterial substrate in more than one dimension.

Example 22

The reconfigurable component of Example 16, Example 17, Example 18, Example 19, Example 20, or Example 21, wherein the metamaterial substrate is elastically deformable.

Example 23

The reconfigurable component of Example 22, wherein the elastic deformation is linear or non-linear.

Example 24

A reconfigurable communication system, comprising: a substrate; a metamaterial shield formed over the substrate wherein the metamaterial shield surrounds one or more components; a plurality of first piezoelectric actuators, wherein actuation of the first piezoelectric actuators deforms the metamaterial shield and changes a frequency band that is permitted to pass through the metamaterial shield; a reconfigurable antenna that includes a metamaterial; a plurality of second piezoelectric actuators, wherein actuation of the second piezoelectric actuators deform the metamaterial of the antenna and changes a central operating frequency of the antenna; and an integrated circuit electrically coupled to the plurality of first piezoelectric actuators and second piezoelectric actuators.

Example 25

The reconfigurable communication system of Example 24, wherein the reconfigurable antenna is shielded by the metamaterial shield.

What is claimed is:

1. A reconfigurable communication system, comprising:
   an organic substrate;
   a metamaterial shield formed over the organic substrate wherein the metamaterial shield surrounds one or more components;
   a plurality of piezoelectric actuators configured to deform the metamaterial shield, wherein the piezoelectric actuators comprise a crystalline piezoelectric material; and
   an integrated circuit electrically coupled to the plurality of piezoelectric actuators.

2. The reconfigurable communication system of claim 1, wherein at least one of the plurality of actuators includes a beam that contacts and deforms the metamaterial shield when deflected, wherein the beam comprises:
   a first electrode;
   a piezoelectric layer formed on the first electrode; and
   a second electrode formed on the piezoelectric layer.

3. The reconfigurable communication system of claim 2, wherein the first electrode is formed below the piezoelectric layer and along a first sidewall of the piezoelectric layer, and wherein the second electrode is formed along a second sidewall of the piezoelectric layer that is opposite to the first sidewall.

4. The reconfigurable communication system of claim 3, wherein the second electrode is also formed over a portion of a top surface of the piezoelectric layer.

5. The microelectronic package of claim 3, wherein the first electrode and the second electrode extend over a cavity formed in the package substrate and are electrically coupled to anchors on the package substrate.

6. The reconfigurable communication system of claim 1, wherein one or more of the piezoelectric actuators include a piezoelectric drive arm extending out from an anchor.

7. The reconfigurable communication system of claim 6, wherein the piezoelectric drive arm contacts and deforms the metamaterial shield when extended.

8. The reconfigurable communication system of claim 1, wherein the piezoelectric actuator comprises:
   a piezoelectric layer formed over the substrate; and
   a diaphragm formed over the piezoelectric layer.

9. The reconfigurable communication system of claim 8, wherein the diaphragm contacts and deforms the metamaterial shield upon contraction of the piezoelectric layer.

10. The reconfigurable communication system of claim 1, wherein the plurality of piezoelectric actuators include a high performance piezoelectric material that is deposited in an amorphous state and annealed with a laser annealing process.

11. The reconfigurable communication system of claim 10, wherein the high performance piezoelectric material is lead zirconate titanate (PZT), potassium sodium niobate (KNN), or zinc oxide (ZnO).

12. The reconfigurable communication system of claim 1, further comprising: an antenna that includes a deformable metamaterial, wherein deforming the metamaterial changes the operating frequency of the antenna.

13. The reconfigurable communication system of claim 12, further comprising one or more piezoelectric actuators configured to deform the metamaterial of the antenna.

14. The reconfigurable communication system of claim 12, wherein the antenna is within the metamaterial shield.

15. The reconfigurable communication system of claim 1, further comprising a plurality of metamaterial components.

16. A reconfigurable component, comprising:
    a metamaterial substrate;
    a plurality of piezoelectric actuators formed on the metamaterial substrate; and
    an integrated circuit packaged adjacent to the metamaterial substrate and coupled to the plurality of piezoelectric actuators, wherein the component is an antenna.

17. The reconfigurable electromagnetic component of claim 16, wherein actuation of the piezoelectric actuators deform the metamaterial substrate and changes a central operating frequency of the antenna.

18. The reconfigurable component of claim 16, wherein the plurality of actuators are configured to deform the metamaterial substrate in more than one dimension.

19. The reconfigurable component of claim 16, wherein the metamaterial substrate is elastically deformable.

20. The reconfigurable component of claim 19, wherein the elastic deformation is linear or non-linear.

21. A reconfigurable communication system, comprising:
    a substrate;
    a metamaterial shield formed over the substrate wherein the metamaterial shield surrounds one or more components;
    a plurality of first piezoelectric actuators, wherein actuation of the first piezoelectric actuators deforms the metamaterial shield and changes a frequency band that is permitted to pass through the metamaterial shield;
    a reconfigurable antenna that includes a metamaterial;
    plurality of second piezoelectric actuators, wherein actuation of the second piezoelectric actuators deform the metamaterial of the antenna and changes a central operating frequency of the antenna; and
    an integrated circuit electrically coupled to the plurality of first piezoelectric actuators and second piezoelectric actuators.

22. The reconfigurable communication system of claim 21, wherein the reconfigurable antenna is shielded by the metamaterial shield.

* * * * *